(12) United States Patent
Park

(10) Patent No.: US 12,237,544 B2
(45) Date of Patent: Feb. 25, 2025

(54) BATTERY CELL ASSEMBLY

(71) Applicant: SAMSUNG SDI CO., LTD., Yongin-si (KR)

(72) Inventor: Sanghun Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 435 days.

(21) Appl. No.: 17/129,387

(22) Filed: Dec. 21, 2020

(65) Prior Publication Data

US 2021/0273303 A1    Sep. 2, 2021

(30) Foreign Application Priority Data

Feb. 27, 2020    (KR) .......................... 10-2020-0024547

(51) Int. Cl.
*H01M 50/536*    (2021.01)
*H01M 50/505*    (2021.01)
(Continued)

(52) U.S. Cl.
CPC ....... *H01M 50/536* (2021.01); *H01M 50/505* (2021.01); *H01M 50/533* (2021.01); *H01M 50/54* (2021.01)

(58) Field of Classification Search
CPC ............. H01M 50/536; H01M 50/505; H01M 50/533; H01M 50/54; H01M 50/528; H01M 50/566; H01M 50/55; H01M 50/50
See application file for complete search history.

(56) References Cited

U.S. PATENT DOCUMENTS 9,451,710 B2    9/2016    Park
9,570,780 B2    2/2017    Byun et al.
(Continued)

FOREIGN PATENT DOCUMENTS

CN    102386449 A    3/2012
CN    104009197 A    8/2014
(Continued)

OTHER PUBLICATIONS

Chinese Office action issued in corresponding application No. CN 202110219538.1, dated Oct. 31, 2022, with English Translation 23 pages.
(Continued)

*Primary Examiner* — Jonathan G Leong
*Assistant Examiner* — Katharine A Caughron
(74) *Attorney, Agent, or Firm* — Lewis Roca Rothgerber Christie LLP

(57)    ABSTRACT

A battery cell assembly includes: a battery cell including a battery cell body and an electrode tab extending from the battery cell body in a first direction; a lead tab at least partially overlapping the electrode tab in the first direction and coupled to the electrode tab to provide an electrical connection therebetween; and a soldering material coupling the electrode tab and the lead tab to each other. At least one of the electrode tab and the lead tab includes: solid portions and openings that are alternately arranged in the first direction, or convex portions and concave portions that are alternately arranged in the first direction, and the soldering material is between adjacent ones of the solid portions or between adjacent ones of the convex portions.

20 Claims, 9 Drawing Sheets

(51) Int. Cl.
 *H01M 50/533* (2021.01)
 *H01M 50/54* (2021.01)

(56) References Cited

U.S. PATENT DOCUMENTS

| | | | |
|---|---|---|---|
| 2009/0246615 A1 | 10/2009 | Park | |
| 2012/0052331 A1* | 3/2012 | Park | H01M 50/528 |
| | | | 429/7 |
| 2014/0234669 A1* | 8/2014 | Byun | H01M 50/534 |
| | | | 429/7 |
| 2020/0328397 A1 | 10/2020 | Park | |

FOREIGN PATENT DOCUMENTS

| | | |
|---|---|---|
| JP | 1999-025951 A | 1/1999 |
| JP | 2019-040840 A | 3/2019 |
| KR | 10-2014-0104738 A | 8/2014 |
| KR | 10-1696008 B1 | 1/2017 |
| KR | 10-2018-0135604 A | 12/2018 |
| KR | 10-2019-0016691 A | 2/2019 |
| KR | 2019016691 A * 2/2019 | ........... B23K 1/0016 |
| KR | 10-2019-0048069 A | 5/2019 |
| WO | WO-2018230796 A1 * 12/2018 | ............... B23K 1/00 |

OTHER PUBLICATIONS

Chinese Office action issued in corresponding application No. CN 202110219538.1, dated Jul. 18, 2023, 13 pages with translation.
Decision of Rejection issued in corresponding application No. CN 202110219538.1, dated Nov. 21, 2023, 20 pages, with English Translation.
Korean Notice of Allowance issued in corresponding KR Application No. 10-2020-0024547, dated Apr. 23, 2024, 2 pages.

* cited by examiner

BATTERY CELL ASSEMBLY

CROSS-REFERENCE TO RELATED APPLICATION

This application claims priority to and the benefit of Korean Patent Application No. 10-2020-0024547, filed on Feb. 27, 2020, in the Korean Intellectual Property Office, the disclosure of which is incorporated herein in its entirety by reference.

BACKGROUND

1. Field

Aspects of embodiments of the present disclosure relate to a battery cell assembly.

2. Description of the Related Art

Generally, secondary (rechargeable) batteries refer to batteries that are designed to be repeatedly charged and recharged, different from primary (non-rechargeable) batteries. Secondary batteries may be used as energy sources of for example, mobile devices, electric vehicles, hybrid electric vehicles, electric bicycles, uninterruptible power supplies, etc. Single-cell secondary batteries or multi-cell secondary batteries (e.g., battery packs or secondary battery packs), which include a plurality of cells connected to each other as a unit, are used according to the types of devices that use the secondary batteries.

Small mobile devices, such as cellular phones, may be operated for a time (e.g., a predetermined time) using single-cell secondary batteries. However, high-output, high-capacity battery packs may be more suitable for devices in which long operating times are desirable and which consume large amounts of power, such as electric vehicles and hybrid electric vehicles. The output voltages or currents of battery packs may be increased by adjusting (or varying) the number of battery cells included in the battery packs.

SUMMARY

One or more embodiments of the present disclosure include a battery cell assembly having an improved structure for coupling different materials to each other between an electrode tab of a battery cell and a lead tab configured to be connected to the electrode tab to form a charge-discharge path.

Additional aspects and features of the present disclosure will be set forth, in part, in the description which follows and, in part, will be apparent from the description or may be learned by practice of the example embodiments of the present disclosure described herein.

According to an embodiment of the present disclosure, a battery cell assembly includes: a battery cell including a battery cell body and an electrode tab extending from the battery cell body in a first direction; a lead tab at least partially overlapping the electrode tab in the first direction and coupled to the electrode tab to provide an electrical connection therebetween; and a soldering material coupling the electrode tab and the lead tab to each other. At least one of the electrode tab and the lead tab includes: solid portions and openings that are alternately arranged in the first direction, or convex portions and concave portions that are alternately arranged in the first direction. The soldering material is between adjacent ones of the solid portions or between adjacent ones of the convex portions.

The soldering material may be between adjacent ones of the solid portions from among the solid portions and on the adjacent ones of the solid portions, or the soldering material may be between adjacent ones of the convex portions from among the convex portions and on the adjacent ones of the convex portions.

The soldering material may in an opening between the adjacent ones of the solid portions and on the adjacent ones of the solid portions, or the soldering material may be in a concave portion between the adjacent ones of the convex portions and on the adjacent ones of the convex portions.

A contact angle measured from the soldering material on the adjacent ones of the solid portions to the adjacent ones of the solid portions may be an acute angle of less than 90 degrees, or a contact angle measured from the soldering material on the adjacent ones of the solid portions to the electrode tab arranged on the adjacent ones of the solid portions may be an acute angle of less than 90 degrees.

The soldering material may be between adjacent ones of the solid portions from among the solid portions, and the adjacent ones of the solid portions may be adjacent to each other with an intermediate solid portion therebetween.

The electrode tab may have a concave portion to bypass the intermediate solid portion between the adjacent ones of the solid portions, and the soldering material may be on the electrode tab.

The intermediate solid portion may be embedded in the soldering material.

The electrode tab may have a concave shape and may be on the adjacent ones of the solid portions while bypassing the intermediate solid portion.

The soldering material may have a droplet shape with, in a second direction crossing the first direction, a maximum height below which the intermediate solid portion is embedded and a minimum height above the adjacent ones of the solid portions.

The second direction may be a normal direction of a surface of the electrode tab.

The lead tab may include: the solid portions arranged with the openings therebetween; and a connection bar connecting ends of the solid portions to each other.

Each of the solid portions may have the end and an opposite end in a third direction that crosses the first direction and a second direction, and the second direction may be a normal direction of a surface of the electrode tab.

The ends of the solid portions may be connected to each other by the connection bar, and the opposite ends of the solid portions may be spaced apart from each other in an open form.

The connection bar may be at a second level in a second direction crossing the first direction, and the second level may be higher than a first level at where the solid portions are arranged in the second direction.

The lead tab may further include a plurality of bent portions that extend between the first level and the second level between the connection bar and the ends of the solid portions and have a round shape convex toward the soldering material, and the plurality of bent portions may respectively correspond to the solid portions.

The lead tab may include the solid portions arranged in the first direction with the openings therebetween, and the electrode tab may have a zigzag shape extending across one of the openings between directly adjacent ones of the solid portions in the first direction. The electrode tab may cover opposite sides of the directly adjacent ones of the solid portions in a second direction crossing the first direction.

The lead tab may include the solid portions that are alternately arranged in the first direction and are at different first and second levels in a second direction crossing the first direction, and the electrode tab may have a flat plate shape extending across a region between adjacent ones of the solid portions arranged at the first level and one of the solid portions at the second level.

The electrode tab may have a flat plate shape at a constant level between the first and second levels in the second direction.

The soldering material may be on the electrode tab between adjacent ones of the solid portions at the first level, and the first level may be higher than the second level in the second direction.

An intermediate solid portion from among the solid portions may be at the second level and between the adjacent ones of the solid portions at the first level, and the intermediate solid portion may support the electrode tab at where the soldering material is arranged.

One of the electrode tab and the lead tab may have an accommodation opening for accommodating the soldering material in an area overlapping the other one of the electrode tab and the lead tab, and the one of the electrode tab and the lead tab having the accommodation opening may be at a higher position in a second direction crossing the first direction than the other one of the electrode tab and the lead tab.

The other of the electrode tab and the lead tab may close and seal a bottom of the accommodation opening in the one of the electrode tab and the lead tab.

The solid portions may be on both sides of the accommodation opening in the first direction and may define the accommodation opening.

The openings may correspond to the accommodation opening.

One of the electrode tab and the lead tab may have the convex portions and the concave portions that are alternately arranged in the first direction, the electrode tab and the lead tab may overlap each other in the first direction, and the one of the electrode tab and the lead tab may be at a higher position in a second direction crossing the first direction than the other one of the electrode tab and the lead tab.

The soldering material may be between adjacent ones of the convex portions from among the convex portions.

The openings may be in the concave portions.

The other of the electrode tab and the lead tab may have the convex portions and the concave portions that are alternately arranged in the first direction.

The electrode tab and the lead tab may have the convex portions and the concave portions at positions facing each other, the openings may be in the concave portions of the one of the electrode tab and the lead tab, and the openings may face the concave portions of the other of the electrode tab and the lead tab.

BRIEF DESCRIPTION OF THE DRAWINGS

The above and other aspects and features of the present disclosure will be more apparent from the following description, taken in conjunction with the accompanying drawings, in which.

DETAILED DESCRIPTION

Figure 1:
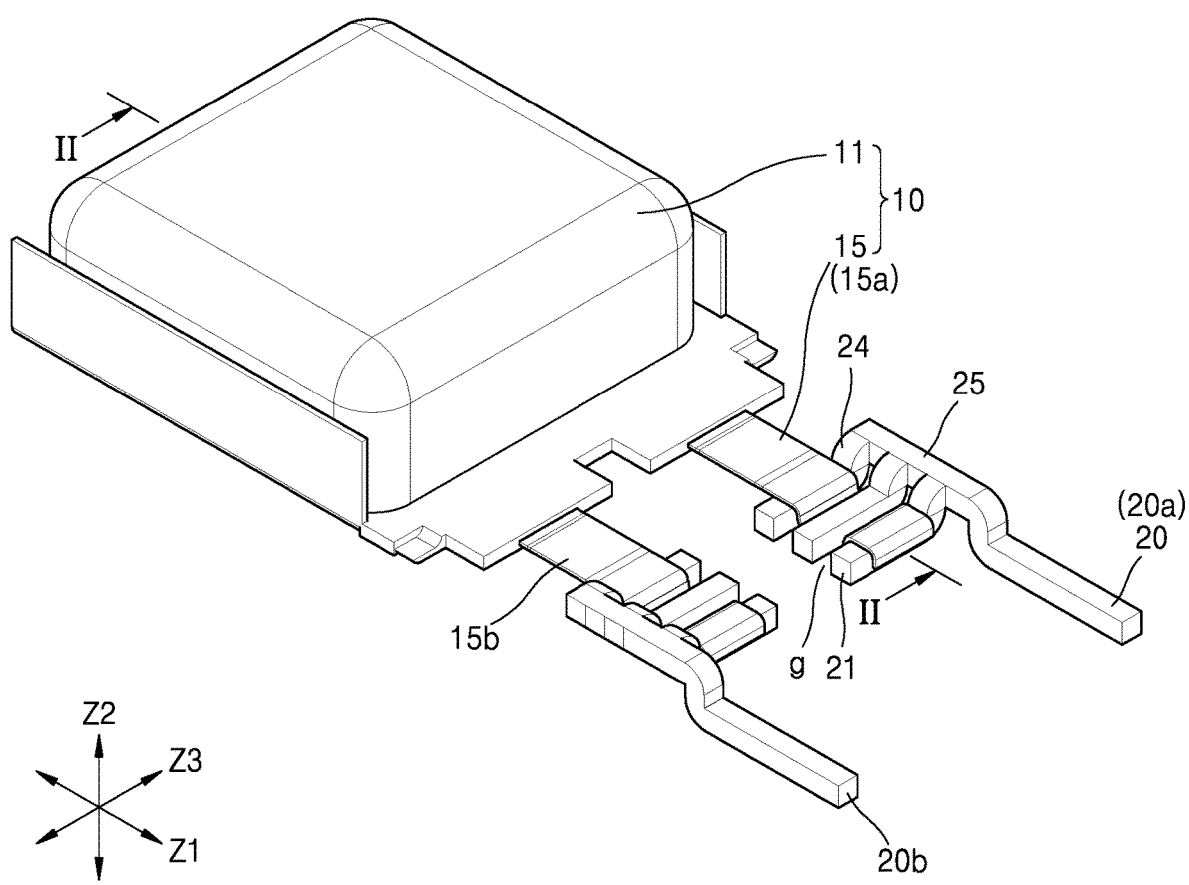
FIG. 1 is a perspective view illustrating a battery cell assembly according to an embodiment.

Reference will now be made in detail to embodiments, examples of which are illustrated in the accompanying drawings. In this regard, the present disclosure may have different forms and should not be construed as being limited to the example embodiments set forth herein. Accordingly, embodiments are merely described below, by referring to the figures, to explain aspects of the present disclosure.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Hereinafter, battery cell assemblies will be described according to embodiments with reference to the accompanying drawings.

Figure 2:
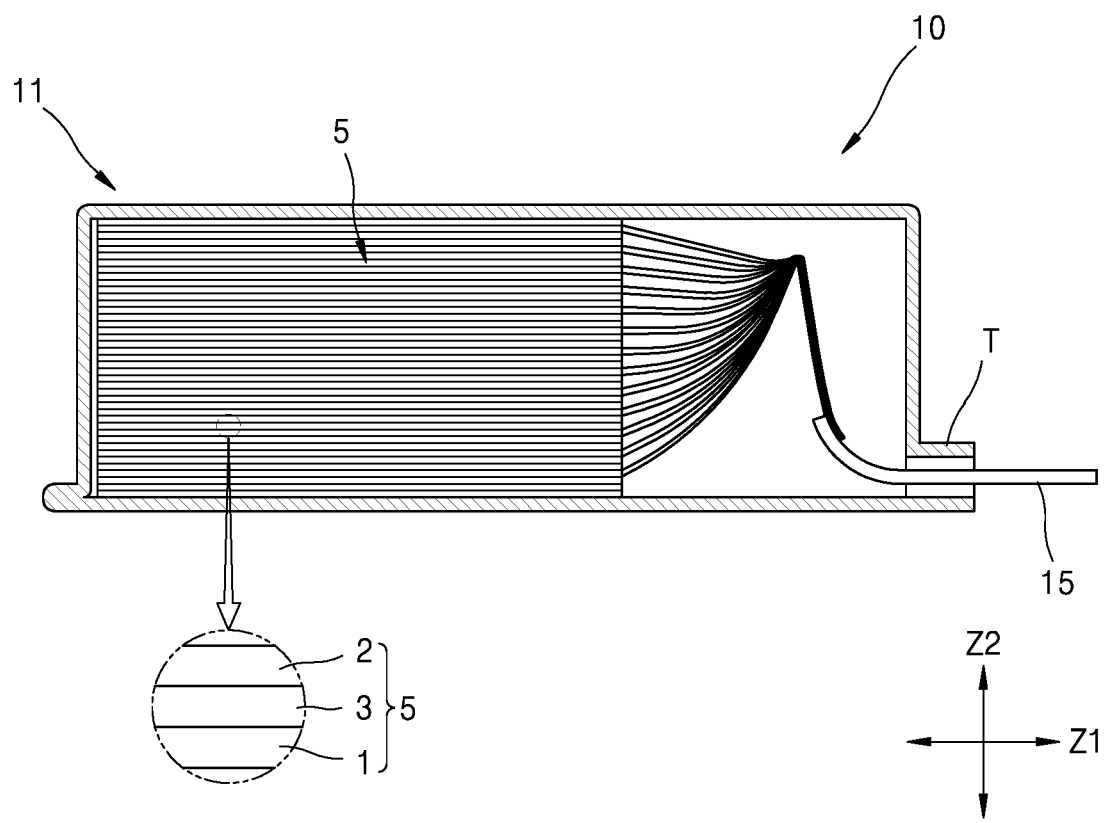
FIG. 2 is a cross-sectional view taken along the line II-II of FIG. 1.
Figure 3:
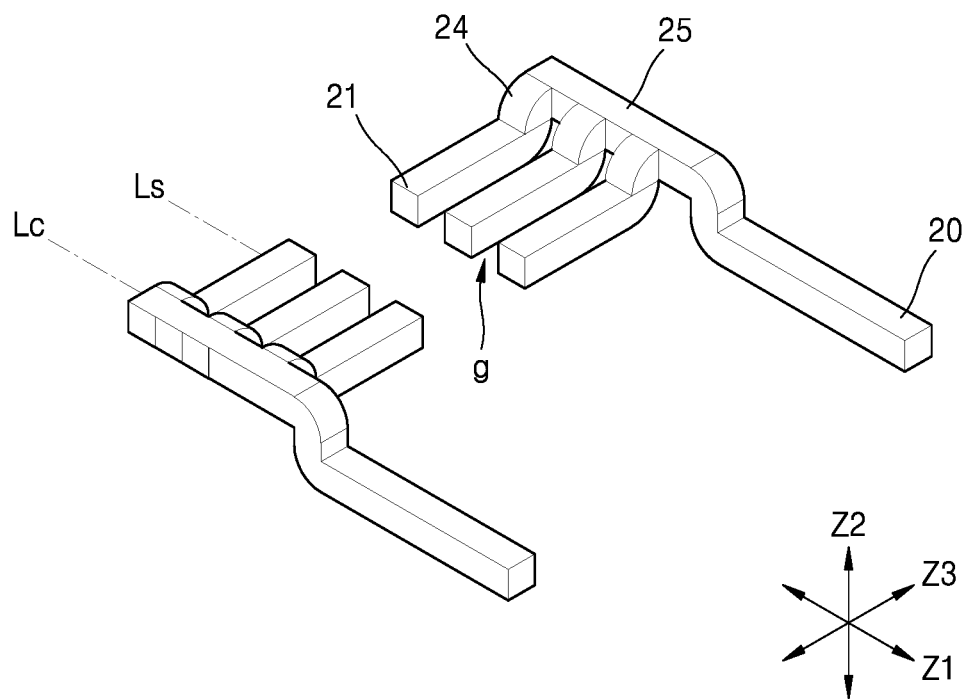
FIG. 3 is a perspective view illustrating a lead tab shown in FIG. 1.
Figure 4:
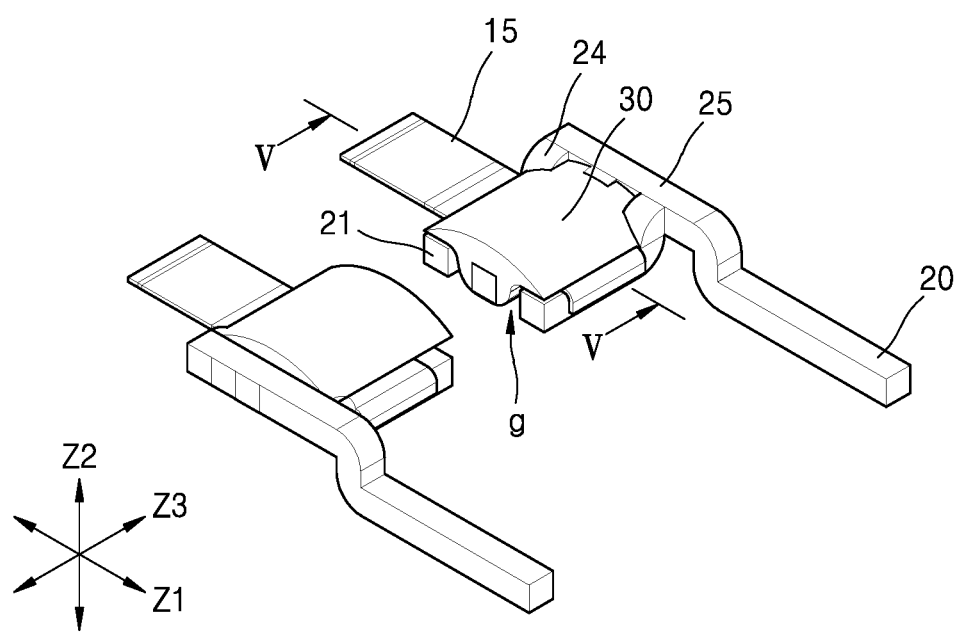
FIG. 4 is a perspective view illustrating a soldering material for coupling an electrode tab to the lead tab.
Figure 5:
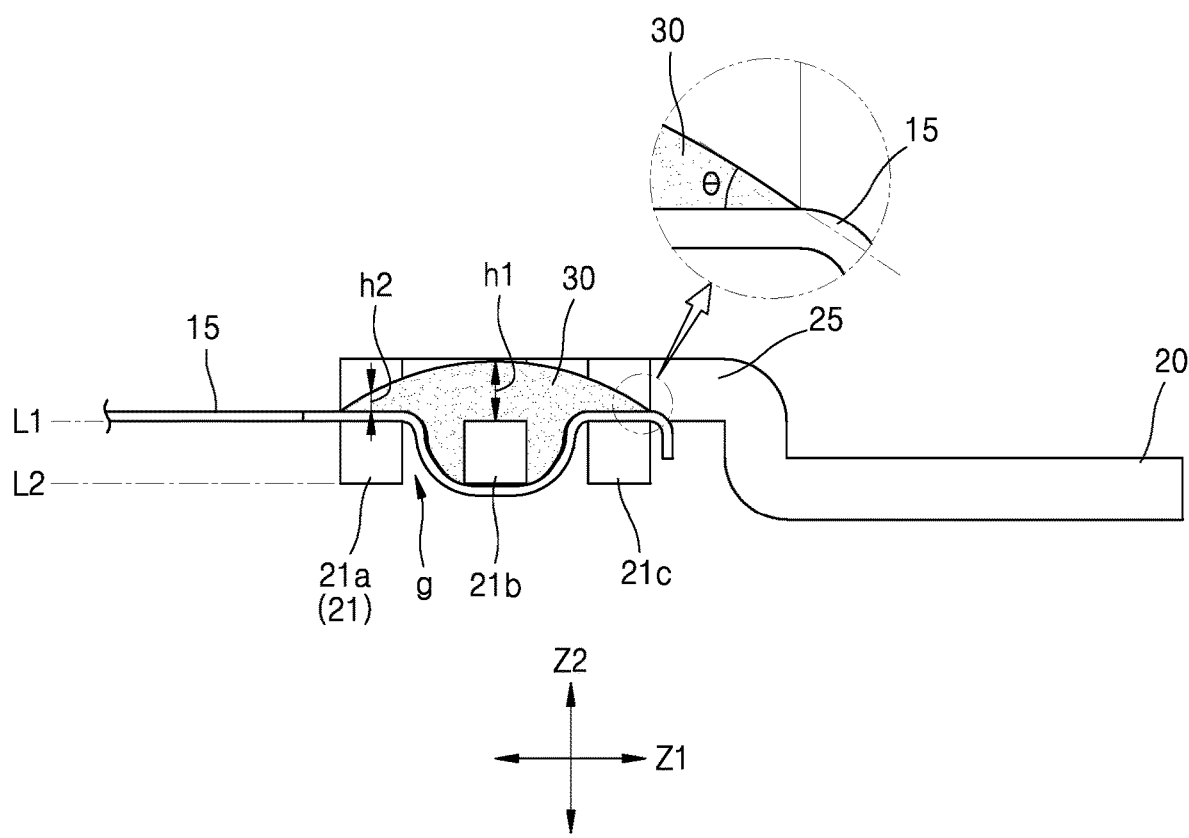
FIG. 5 is a cross-sectional view taken along the line V-V of FIG. 4.

FIG. 1 is a perspective view illustrating a battery cell assembly according to an embodiment. FIG. 2 is a cross-sectional view taken along the line II-II of FIG. 1. FIG. 3 is a perspective view illustrating a lead tab 20 shown in FIG. 1. FIG. 4 is a perspective view illustrating a soldering material 30 for coupling an electrode tab 15 to the lead tab 20. FIG. 5 is a cross-sectional view taken along the line V-V of FIG. 4.

Referring to FIGS. 1 to 5, according to an embodiment, the battery cell assembly may include: a battery cell 10, which includes a battery cell body 11 and an electrode tab 15 extending from the battery cell body 11 in a first direction Z1; and a lead tab 20, which at least partially overlaps the electrode tab 15 in the first direction Z1 and is connected to the electrode tab 15 to provide electrical connection therebetween. At least one of the electrode tab 15 and the lead tab 20 may include solid portions 21 and openings (g) (see, e.g., FIG. 1), which are alternately arranged in the first direction Z1, or may include convex portions 321 and concave portions 322 (see, e.g., FIG. 11), which are alternately arranged in the first direction Z1. The battery cell assembly may further include the soldering material 30 provided between the solid portions 21 or the convex portions 321 for coupling the electrode tab 15 and the lead tab 20 to each other.

Referring to FIG. 2, the battery cell 10 may include: the battery cell body 11 including (or accommodating) an electrode assembly 5; and the electrode tab 15 extending from the battery cell body 11. The electrode tab 15 may be electrically connected to the electrode assembly 5 and may extend from the battery cell body 11 in the first direction Z1. The electrode assembly 5 may include: first and second electrode plates 1 and 2 having different polarities from each other; and a separator 3 arranged between the first and second electrode plates 1 and 2. The electrode assembly 5 may be formed in a roll type by winding the first and second electrode plates 1 and 2 with the separator 3 therebetween or in a stacked type by stacking a plurality of first and second electrode plates 1 and 2 with separators 3 therebetween.

Referring to FIGS. 1 and 2, in an embodiment, the electrode tab 15 may include first and second electrode tabs 15a and 15b, which have different polarities from each other and are respectively electrically connected to the first and second electrode plates 1 and 2 of the electrode assembly 5. In an embodiment, the first electrode plate 1 may include aluminum or an aluminum alloy, and the second electrode plate 2 may include copper or a copper alloy. In one embodiment, the first and second electrode tabs 15a and 15b may include the same materials as the materials of the corresponding first and second electrode plates 1 and 2 or may include materials having properties similar to the properties of the materials of the corresponding first and second electrode plates 1 and 2. That is, in some embodiments, the first and second electrode tabs 15a and 15b may include different materials. For example, the first electrode tab 15a may include aluminum or an aluminum alloy, and the second electrode tab 15b may include nickel, a nickel alloy, copper, or a copper alloy.

Throughout this disclosure, the electrode tab 15 may refer to any one of the first and second electrode tabs 15a and 15b or to both of the first and second electrode tabs 15a and 15b, and description of the electrode tab 15 may apply to one of the first and second electrode tabs 15a and 15b or to both of the first and second electrode tabs 15a and 15b. Similarly, throughout this disclosure, the lead tab 20 may refer to any one of first and second lead tabs 20a and 20b or to both of the first and second lead tabs 20a and 20b, and description of the lead tab 20 may apply to any one of the first and second lead tabs 20a and 20b or to both of the first and second lead tabs 20a and 20b.

Referring to FIGS. 1 to 5, the lead tab 20 may be coupled to the electrode tab 15, which extends from the battery cell body 11. For example, the lead tab 20 may at least partially overlap the electrode tab 15 of the battery cell 10 in the first direction Z1 and may be electrically connected to the electrode tab 15 of the battery cell 10. The lead tab 20 may be connected to the electrode tab 15 of the battery cell 10 to form a charge-discharge path of the battery cell 10, and in an embodiment, the lead tab 20 may form a charge-discharge path between the battery cell 10 and a circuit (e.g., a circuit unit).

In an embodiment, the lead tab 20 may include the solid portions 21 and the openings (g), which are alternately arranged in the first direction Z1 in which the electrode tab 15 extends. The solid portions 21 may refer to a structure in which the soldering material 30 is blocked between every two adjacent solid portions 21 and is thus contained between the two adjacent solid portions 21. Throughout this disclosure, the expression "two adjacent solid portions 21 block the soldering material 30" may collectively refer to a structure in which two adjacent solid portions 21 block the soldering material 30 and a structure (see, e.g., FIG. 5) in which, instead of the solid portions 21, the electrode tab 15 is inserted between the solid portions 21 and concavely deformed according to the shape of the solid portions 21 and blocks the soldering material 30 between the solid portions 21. In addition, throughout this disclosure, the expression "the soldering material 30 is provided between two adjacent solid portions 21 (for example, first and third solid portions 21a and 21c)" may not only refer to a structure in which the soldering material 30 is provided between two most adjacent (e.g., directly adjacent) solid portions 21 (for example, between a pair of first and second solid portions 21a and 21b and between a pair of second and third solid portions 21b and 21c) from among the solid portions 21 arranged in the first direction Z1, but may also refer to, for example, a structure in which the soldering material 30 is provided between two solid portions 21 (for example, the first and third solid portions 21a and 21c) which are adjacent to each other in the first direction Z1 with an intermediate solid portion 21 (for example, the second solid portion 21b) therebetween. For example, in an embodiment, the soldering material 30 provided on the electrode tab 15 and the lead tab 20, which overlap each other, may be between two most adjacent solid portions 21 in the first direction Z1 (for example, the pair of first and second solid portions 21a and 21b, and the pair of second and third solid portions 21b and 21c), and between two adjacent solid portions 21 (for example, the first and third solid portions 21a and 21c) which are adjacent to each other in the first direction Z1 with an intermediate solid portion 21 (for example, the second solid portion 21b) therebetween. In such an embodiment, a region between the two adjacent solid portions 21 (for example, the first and third solid portions 21a and 21c) at where the soldering material 30 is provided may refer to a region including two openings (g) formed between most adjacent solid portions 21 (for example, between the first and second solid portions 21a and 21b, and between the second and third solid portions 21b and 21c) and the intermediate solid portion 21 (for example, the second solid portion 21b) between the adjacent solid portions 21 (for example, the first and third solid portions 21a and 21c).

Each of the openings (g) may refer to an open space formed between two adjacent solid portions 21 (for example, between the pair of first and second solid portions 21a and 21b, or between the pair of second and third solid portions 21b and 21c). In an embodiment, when the openings (g), that is, open spaces, are partially closed by the electrode tab 15 provided at the peripheries of the openings (g), a structure capable of containing the soldering material 30 may be provided.

The soldering material 30 may be provided between two adjacent solid portions 21 (for example, the first and third solid portions 21a and 21c). Throughout this disclosure, the expression "the soldering material 30 is provided between two adjacent solid portions 21 (for example, the first and third solid portions 21a and 21c)" may denote a structure in which the soldering material 30 is provided between two adjacent solid portions 21 (for example, the first and third solid portions 21a, 21c) and above the two adjacent solid portions 21 (for example, the first and third solid portions 21a and 21c).

That is, in various embodiments, the soldering material 30 may be provided between two adjacent solid portions 21 (for example, the first and third solid portions 21a, 21c) and above the two adjacent solid portions 21 (for example, the first and third solid portions 21a and 21c). For example, the soldering material 30 may be provided at least in the openings (g) between two adjacent solid portions 21 (for example, the first and third solid portions 21a and 21c) to fill the openings (g) and may also be provided above the two adjacent solid portions 21 (for example, the first and third solid portions 21a and 21c) to have a height (e.g., a predetermined height) after filling (or above) the openings (g) and covering the intermediate solid portion 21 (for example, the second solid portions 21b). In such an embodiment, owing to affinity between the two adjacent solid portions 21 (for example, the first and third solid portions 21a and 21c) and the soldering material 30 provided above the two adjacent solid portions 21 (for example, the first and third solid portions 21a and 21c), the flow of the soldering material 30 may be limited (or restricted) such that the soldering material 30 may not flow away from the region between the two adjacent solid portions 21 (for example, the first and third solid portions 21a and 21c). For example, the soldering material 30 may fill the openings (g) between two adjacent solid portions 21 (for example, the first and third solid portions 21a and 21c) and may cover the intermediate solid portion 21 (for example, the second solid portions 21b) to have a height and a convex droplet shape protruding in a second direction Z2 perpendicular to the first direction Z1. In such an embodiment, the soldering material 30 filling the openings (g) or covering the intermediate solid portion 21 (for example, the second solid portions 21b) may have a maximum level (e.g., a maximum height) h1. In addition, the soldering material 30 may have a droplet shape with a smaller (or minimal) level (e.g., a smaller height) h2 on the adjacent solid portions 21 (for example, the first and third solid portions 21a and 21c). The second direction Z2 may refer to a direction in which a surface of the electrode tab 15 is viewed, for example, the direction of (or normal to) the surface of the electrode tab 15. In an embodiment, the second direction Z2 may correspond to the gravity direction (e.g., the gravity direction during a soldering process). In various embodiments, the soldering material 30 may be also be provided in a region outside of the adjacent two solid portions 21 (for example, the first and third solid portions 21a and 21c), but most of the soldering material 30 may be provided between the two adjacent solid portions 21 (for example, the first and third solid portions 21a and 21c), which are adjacent in the first direction Z1.

Throughout this disclosure, the expression "the soldering material 30 is provided between two adjacent solid portions 21 (for example, the first and third solid portions 21a and 21c)" does not limit the position of the soldering material 30 to the openings (g) between the two adjacent solid portions 21 (for example, the first and third solid portions 21a, 21c). For example, the soldering material 30 may fill the openings (g) between the two adjacent solid portions 21 (for example, the first and third solid portions 21a and 21c) or may fill the openings (g) and cover the intermediate solid portion 21 (for example, the second solid portions 21b) to have a height (e.g., a predetermined height) above the two adjacent solid portions 21 (for example, the first and third solid portions 21a and 21c).

Referring to FIG. 5, in an embodiment, the lead tab 20 may include the solid portions 21 and the openings (g), which are alternately arranged in the first direction Z1 in which the electrode tab 15 extend. The lead tab 20 may include the solid portions 21, which are arranged in the first direction Z1, with the openings (g) therebetween, and the electrode tab 15 may be inserted into the lead tab 20 in a zigzag form reciprocating between first and second levels L1 and L2 such that the electrode tab 15 may cross (e.g., extend through) an opening (g) between two solid portions 21, which are most adjacent to each other in the first direction Z1 and may cover opposite sides of the two most adjacent solid portions 21 in the second direction Z2. Here, the two solid portions 21 which are most adjacent to each other in the first direction Z1 may refer to two solid portions 21 (for example, the pair of first and second solid portions 21a and 21b and the pair of second and third solid portions 21b and 21c) which directly face each other in the first direction Z1 without an intermediate solid portion 21 therebetween.

For example, in an embodiment, the lead tab 20 may include first, second, and third solid portions 21a, 21b, and 21c, which are sequentially arranged in the first direction Z1. In this embodiment, most adjacent solid portions 21 in the first direction Z1 may include the pair of first and second solid portions 21a and 21b and the pair of second and third solid portions 21b and 21c. The electrode tab 15 may extend such that the electrode tab 15 may cross the opening (g) between the first and second solid portions 21a and 21b and may cover opposite upper and lower sides of the first and second solid portions 21a and 21b in the second direction Z2, and similarly, the electrode tab 15 may extend and cross the opening (g) between the second and third solid portions 21b and 21c and cover opposite lower and upper sides of the second and third solid portions 21b and 21c in the second direction Z2. As described above, the electrode tab 15 may extend in a zigzag form reciprocating between the first and second levels L1 and L2 in the second direction Z2 such that the electrode tab 15 may cover opposite sides of the solid portions 21 which are most adjacent to each other in the first direction Z1. For example, in an embodiment, the expression "the electrode tab 15 extends in a zigzag form to cover opposite sides of most adjacent solid portions 21" may indicate that the electrode tab 15 extends in a zigzag form while covering opposite upper and lower sides (corresponding to the first and second levels L1 and L2, which are different from each other in the second direction Z2) of solid portions 21 in the second direction Z2 perpendicular to the first direction Z1 in which the solid portions 21 are arranged.

As described above, the electrode tab 15 may extend in a zigzag form while crossing the openings (g) formed between the solid portions 21, which are arranged in the first direction Z1. In an embodiment, the solid portions 21 may include the first, second, and third solid portions 21a, 21b, and 21c arranged in the first direction Z1, and in this embodiment, the soldering material 30 may be provided between the first and third solid portions 21a and 21c, which are adjacent to each other in the first direction Z1 for coupling the electrode tab 15 and the lead tab 20 to each other. For example, in an embodiment, the soldering material 30 may be provided between the first and third solid portions 21a and 21c, which are adjacent to each other with an intermediate solid portion 21b (the second solid portion 21b) being therebetween. In this embodiment, the soldering material 30 may be provided in a region including two openings (g) formed between most adjacent solid portions 21 (for example, between the first and second solid portions 21a and 21b and between the first and third solid portions 21a and 21c) and the intermediate solid portion 21 (for example, the second solid portion 21b).

In an embodiment, the soldering material 30 may be provided on the electrode tab 15 having a concave shape for being inserted between the first, second, and third solid portions 21a, 21b, and 21c. For example, the soldering material 30 may be provided on the electrode tab 15, which is concavely formed to be inserted while bypassing the intermediate solid portion 21 (corresponding to the second solid portion 21b). For example, the electrode tab 15 may have a concave shape to be provided between the first and third solid portions 21a and 21c while being placed on the first and third solid portions 21a and 21c and bypassing the intermediate solid portion 21 (e.g., the second solid portion 21b). In addition, the soldering material 30 may be provided on the electrode tab 15, which has a concave shape bypassing the intermediate solid portion 21 (the second solid portion 21b). In this embodiment, the soldering material 30 is provided on the electrode tab 15 having a concave shape while covering the intermediate solid portion 21 (e.g., the second solid portion 21b), which is placed on the electrode tab 15. As described above, the soldering material 30 for coupling the electrode tab 15 and the lead tab 20 to each other is formed to cover the intermediate solid portion 21 (e.g., the second solid portion 21b) on the electrode tab 15, which has a concave shape, such that the electrode tab 15 and the lead tab 20 may be securely coupled to each other by the soldering material 30.

In an embodiment, the soldering material 30 for coupling the electrode tab 15 and the lead tab 20 to each other may be provided between the first and third solid portions 21a and 21c, which are adjacent to each other. Here, the soldering material 30 provided between the first and third solid portions 21a and 21c may have a structure (or shape or form) which is formed on the first and third solid portions 21a and 21c.

For example, the soldering material 30 may fill the openings (g) formed between the first and third solid portions 21a and 21c adjacent to each other, or may fill the openings (g) and cover the intermediate solid portion 21 (e.g., the second solid portion 21b) to have a height (e.g., a predetermined height). In this embodiment, the soldering material 30 may also be provided on the first and third solid portions 21a and 21c adjacent to each other. For example, the soldering material 30 may be formed in the form of a droplet covering the first and third solid portions 21a and 21c adjacent to each other. In this embodiment, the soldering material 30 may be formed in a droplet shape to fill the openings (g) in the second direction Z2, which is perpendicular to the first direction Z1 in which the first, second, and third solid portions 21a, 21b, and 21c are arranged, or to cover the intermediate solid portion 21 (e.g., the second solid portion 21b) and have a maximum level h1 and a minimum level h2 between the first and third solid portions 21a and 21c.

For example, the first and third solid portions 21a and 21c may have affinity with the soldering material 30 provided on the first and third solid portions 21a and 21c, such that the soldering material 30 may not flow out of the region between the first and third solid portions 21a and 21c in the first direction Z1, and most of the soldering material 30 may be provided between (or retained between) the first and third solid portions 21a and 21c in the first direction Z1. For example, the affinity (e.g., bonding strength) between the first and third solid portions 21a and 21c and the soldering material 30 provided on the first and third solid portions 21a and 21c may be assessed by the contact angle between the soldering material 30 formed in a droplet shape due to surface tension and the first and third solid portions 21a and 21c, or by the contact angle θ between the soldering material 30 formed in a droplet shape and the electrode tab 15 arranged on the first and third solid portions 21a and 21c. For example, the contact angle between the soldering material 30 formed in a droplet shape and the first and third solid portions 21a and 21c, or the contact angle θ between the soldering material 30 formed in a droplet shape and the electrode tab 15 arranged on the first and third solid portions 21a and 21c may be an acute angle of less than 90 degrees due to the affinity and the material properties. Owing to the affinity between the soldering material 30 and the first and third solid portions 21a and 21c, or between the soldering material 30 and the electrode tab 15 arranged on the first and third solid portions 21a and 21c, most of the soldering material 30 may not be formed outside the region between the first and third solid portions 21a and 21c. However, in various embodiments, an extra amount of the soldering material 30 may be formed outside the region between the first and third solid portions 21a and 21c.

Referring to FIG. 3, in an embodiment, the lead tab 20 may include: the solid portions 21 arranged in the first direction Z1; and a connection bar 25 which connects ends of the solid portions 21 to each other. In an embodiment, the solid portions 21 may extend in a third direction Z3 crossing the first direction Z1 in which the electrode tab 15 extends and the second direction Z2 in which the surface of the electrode tab 15 is viewed (e.g., the surface of the electrode tab 15 may be normal to the second direction Z2), and each of the solid portions 21 may include an end and the other end in the third direction Z3. The connection bar 25 may connect the ends (e.g., one end of each) of the solid portions 21 to each other while extending across the ends of the solid portions 21.

In an embodiment, the second direction Z2 may be perpendicular to the first and third directions Z1 and Z3. Furthermore, in an embodiment, the second direction Z2 may correspond to the direction of gravity. As described later, the connection bar 25, which is formed at a second level Lc higher in the second direction Z2 than a first level Ls at where the solid portions 21 are formed, may prevent or substantially prevent the soldering material 30 from moving outside the connection bar 25 and, thus, may act as a structure confining the soldering material 30.

The connection bar 25 may extend across the ends of the solid portions 21 in the first direction Z1 in which the solid portions 21 are arranged and may connect the ends of the solid portions 21 to each other. For example, the ends of the solid portion 21 may be connected to each other and may be closed by the connection bar 25, and the other ends of the solid portions 21 may be spaced apart from each other in an open form.

In an embodiment, the connection bar 25 connecting the ends of the solid portions 21 to each other may provide a structure for confining the soldering material 30. For example, the connection bar 25 may limit the flow of the soldering material 30 such that the soldering material 30 may not move outside the connection bar 25 in the third direction Z3 crossing the first direction Z1 in which the solid portions 21 are arranged.

In an embodiment, the soldering material 30 may be provided on the solid portions 21 up to a level higher than the solid portions 21 in the second direction Z2 crossing the first direction Z1. For example, the connection bar 25 may be arranged at the second level Lc higher than the first level Ls at which the solid portions 21 are arranged. For example, since the connection bar 25 is formed at the second level Lc higher than the first level Ls, the connection bar 25 may provide a structure capable of confining the soldering material 30 provided on the solid portions 21. For example, the connection bar 25 is formed at a level higher than the solid portion 21 in the second direction Z2, such that the connection bar 25 may provide a structure capable of confining the soldering material 30 on the solid portions 21 in the third direction Z3 (see, e.g., FIG. 4). The connection bar 25, which is formed at a level higher than the solid portions 21 in the second direction Z2 corresponding to the direction of gravity, may confine the soldering material 30 such that the soldering material 30 may not move outside the connection bar 25 in the third direction Z3.

In an embodiment, the lead tab 20 includes bent portions 24, which have a convexly rounded shape to smoothly connect the first and second levels Ls and Lc to each other between the solid portions 21 (for example, the ends of the solid portions 21) formed at the first level Ls and the connection bar 25 formed at the second level Lc. The bent portions 24 may smooth the level difference between the connection bar 25 formed at the second level Lc and the solid portions 21 (for example, the ends of the solid portions 21) formed at the first level Ls, thereby providing a structure for confining the soldering material 30 having a droplet shape. For example, the bent portions 24 may have a round shape to increase the contact area with the soldering material 30 having a droplet shape and may prevent or substantially prevent the soldering material 30 from moving outside the bent portions 24 and the connection bar 25. In addition, the bent portions 24 may have a round shape convex toward the soldering material 30, such that the bent portions 24 may provide a structure which blocks or substantially blocks the soldering material 30 and prevents or substantially prevents the soldering material 30 from moving outside the bent portions 24 and the connection bar 25. In an embodiment, the bent portions 24 may be formed between the connection bar 25 and the solid portions 21, and the number of bent portions 24 may correspond to the number of solid portions 21.

Figure 6:
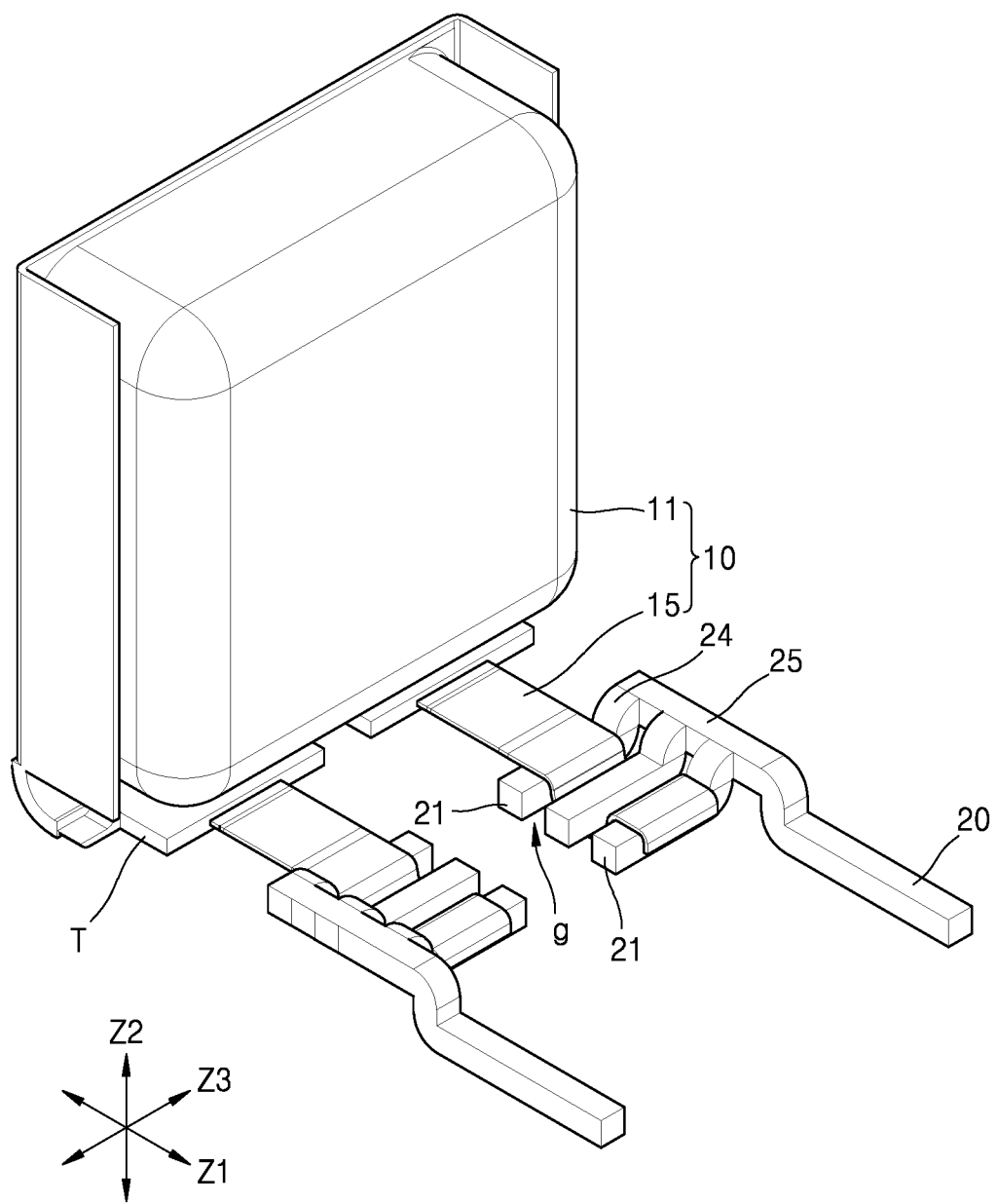
FIG. 6 is a perspective view illustrating a battery cell assembly according to another embodiment.

FIG. 6 is a perspective view illustrating a battery cell assembly according to another embodiment. Some aspects of the battery cell assembly shown in FIG. 6 are similar to those described-above with respect to the battery cell assembly shown in FIG. 1, and repeated description of such features may be omitted. In the embodiment shown in FIG. 1, a terrace portion T from which the electrode tab 15 extends outward is parallel to the battery cell body 11, that is, parallel to the plane (e.g., horizontal plane) on which the battery cell body 11 is placed. in the embodiment shown in FIG. 6, the terrace portion T from which the electrode tab 15 extends outward is bent from the plane (e.g., vertical plane) on which the battery cell body 11 is placed. In various embodiments, the battery cell assembly may be variously modified to provide a compact structure, and in the embodiment shown in FIG. 6, the terrace portion T from which the electrode tab 15 extends outward may be bent from the battery cell body 11.

Figure 7:
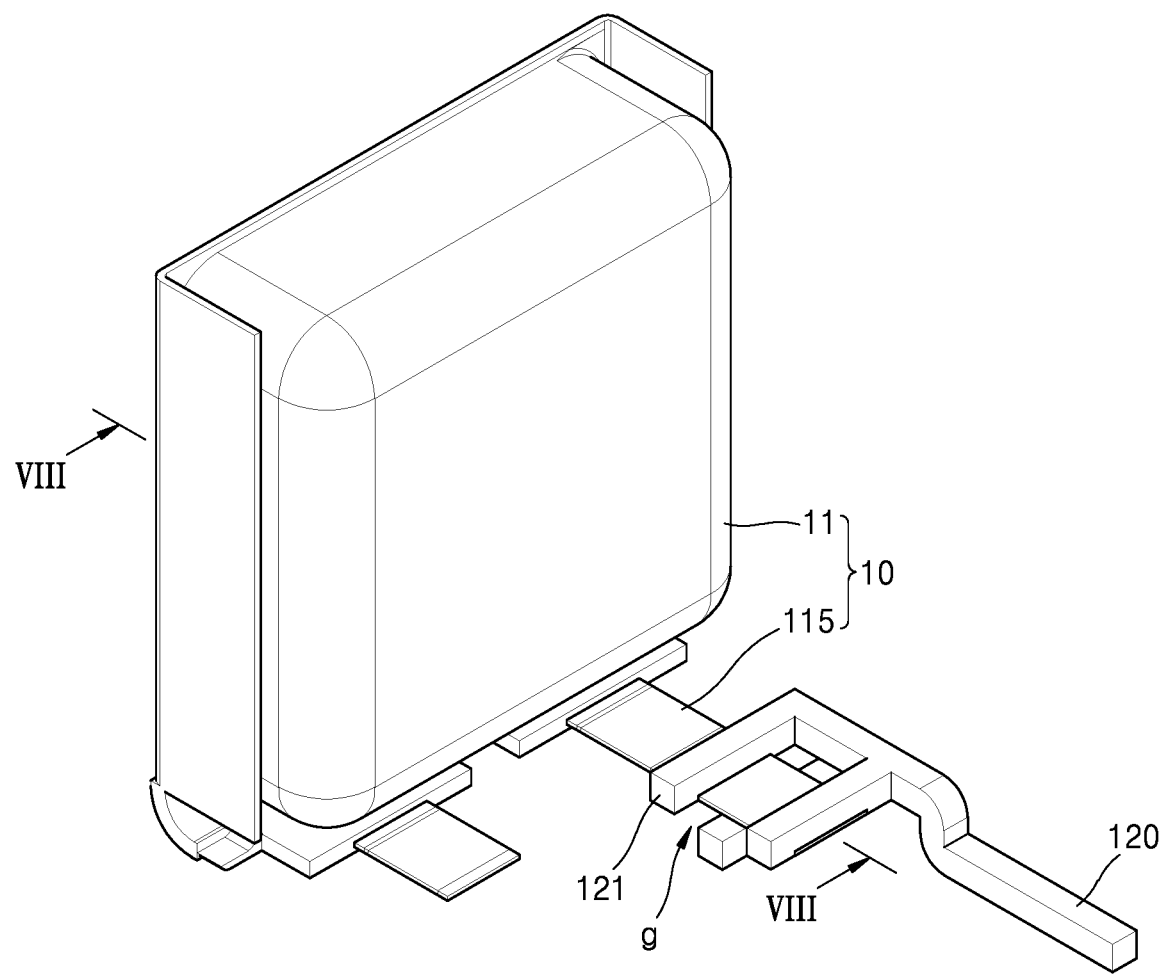
FIG. 7 is a perspective view illustrating a battery cell assembly according to another embodiment.
Figure 8:
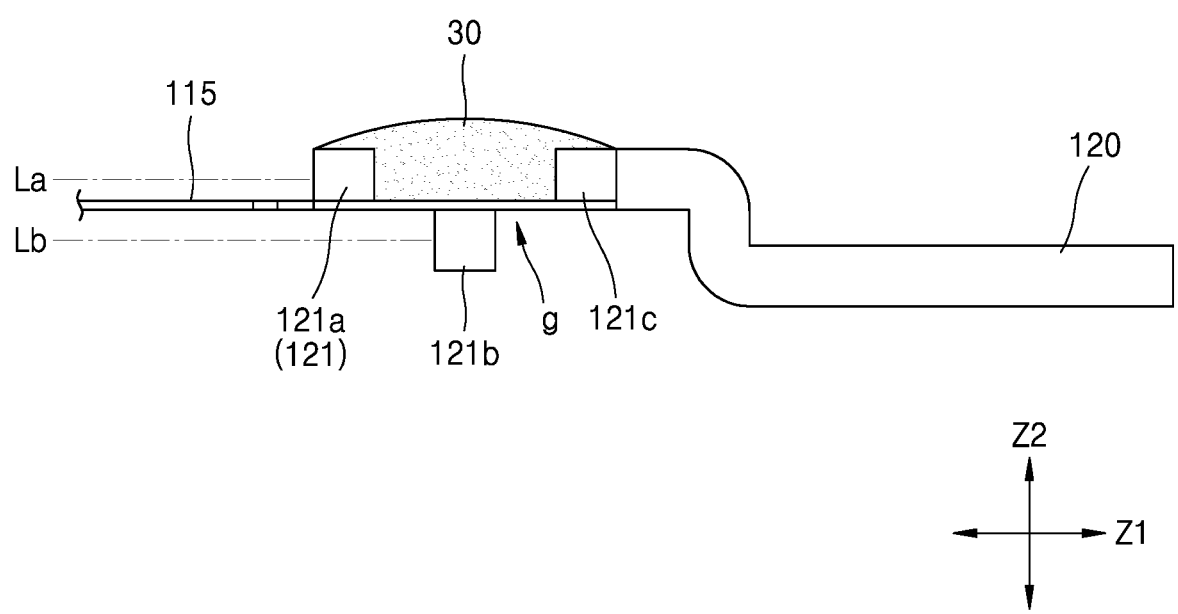
FIG. 8 is a cross-sectional view taken along the line VIII-VIII of FIG. 7.

FIG. 7 is a perspective view illustrating a battery cell assembly according to another embodiment. FIG. 8 is a cross-sectional view taken along the line VIII-VIII of FIG. 7.

Referring to FIGS. 7 and 8, a lead tab 120 may include solid portions 121 and openings (g), which are alternately arranged in a first direction Z1 in which an electrode tab 115 extends. In this embodiment, the solid portions 121 may include first, second, and third solid portions 121a, 121b, and 121c, which are arranged in the first direction Z1. The first, second, and third solid portions 121a, 121b, and 121c arranged in the first direction Z1 may be at different first and second levels La and Lb in a second direction Z2 crossing the first direction Z1. In an embodiment, the second direction Z2 may refer to a direction toward a surface of the electrode tab 115, that is, the direction of (or normal to) the surface of the electrode tab 115. In an embodiment, the second direction Z2 may correspond to the direction of gravity.

In an embodiment, the first and third solid portions 121a and 121c may be arranged at the first level La higher than an intermediate solid portion 121 (e.g., the second solid portion 121b), which is arranged therebetween, and the intermediate solid portion 121 (e.g., the second solid portion 121b) may be arranged between the first and third solid portions 121a and 121c at the second level Lb lower than the first and third solid portions 121a and 121c. For example, the solid portions 121 arranged in the first direction Z1 may be located at the first and second levels La and Lb that are different from each other in the second direction Z2, and in an embodiment, the solid portions 121 may be alternately arranged at the first level La which is relatively high and the second level Lb which is relatively low in the second direction Z2. In this manner, the solid portions 121 arranged in the first direction Z1 are located at the first and second levels La and Lb, which are different in the second direction Z2, such that the electrode tab 115 may extend between the solid portions 121 arranged at the different first and second levels La and Lb. For example, the electrode tab 115 may extend between the first and third solid portions 121a and 121c arranged at the first level La, which is relatively high in the second direction Z2, and the second solid portion 121b arranged at the second level Lb, which is relatively low in the second direction Z2 (e.g., the electrode tab 115 may extend between the solid portions 121 without having a zigzag form, for example, while having a straight shape). Different from the illustrated embodiment, in the embodiment shown in FIG. 5, the electrode tab 15 may extend in the first direction Z1 in a zigzag form across the openings (g) formed between solid portions 21, which are most adjacent in the first direction Z1 (for example, between the pair of first and second solid portions 21a and 21b and between the pair of second and third solid portions 21b and 21c) while the electrode tab 15 reciprocates between the first and second levels L1 and L2, which are different from each other in the second direction Z2, to cover opposite upper and lower sides of the solid portions 21 located at substantially the same level in the second direction Z2.

In the embodiment shown in FIGS. 7 and 8, the electrode tab 115 may extend across a region between the solid portions 121, which are arranged in the first direction Z1 alternatingly at the first and second levels La and Lb, which are different from each other in the second direction Z2. For example, the electrode tab 115 may be formed in a flat plate shape at the same level between the first and second levels La and Lb in the second direction Z2 crossing the first direction Z1 and may extend between the first and third solid portions 121a and 121c arranged at the first level La in the second direction Z2 and the second solid portion 121b arranged at the second level Lb in the second direction Z2. For example, in the embodiment shown in FIG. 5, the electrode tab 15 may extend while reciprocating between the first and second levels L1 and L2 which are different from each other in the second direction Z2, such that the electrode tab 15 may extend across the openings (g) between the solid portions 21 arranged in the first direction Z1 substantially at the same level and may cover opposite upper and lower sides of most adjacent solid portions 121. Different from the embodiment shown in FIG. 5, in the embodiment shown in FIGS. 7 and 8, the electrode tab 115 may have a flat plate shape extending across the region between the solid portions 121 arranged at the first and second levels La and Lb, which are different from each other in the second direction Z2. For example, in the embodiment shown in FIG. 5, the solid portions 21 may be formed at substantially the same level in the second direction Z2, and the electrode tab 15 may extend while reciprocating between the different first and second levels L1 and L2. However, in the embodiment shown in FIGS. 7 and 8, the solid portions 121 are arranged at the first and second levels La and Lb, which are different from each other in the second direction Z2, and the electrode tab 115 may have a flat plate shape crossing the region formed between the different first and second levels La and Lb, that is, a flat plate shape extending substantially at the same level in the second direction Z2.

A soldering material 30 may be formed to have a height (e.g., a predetermined height) on the electrode tab 115, which extends in a flat plate shape between the different first and second levels La and Lb. In this embodiment, the soldering material 30 may be provided on the electrode tab 115 between the first and third solid portions 121a and 121c, which are adjacent to each other, that is, between the first and third solid portions 121a and 121c, which are formed at the relatively high first level La. In this embodiment, the intermediate solid portion 121 (e.g., the second solid portion 121b) formed between the first and third solid portions 121a and 121c at the relatively low second level Lb may support the electrode tab 115 on which the soldering material 30 is provided.

For example, the soldering material 30 may be provided on the electrode tab 115 between the first and third solid portions 121a and 121c, which are adjacent to each other with the intermediate solid portion 121 (e.g., the second solid portion 121b) therebetween, and the first and third solid portions 121a and 121c may provide a structure which blocks the soldering material 30 to contain the soldering material 30 between the first and third solid portions 121a and 121c.

The electrode tab 115 on which the soldering material 30 is provided may extend across the intermediate solid portion 121 (e.g., the second solid portion 121b) between the first and third solid portions 121a and 121c. For example, the intermediate solid portion 121 (e.g., the second solid portion 121b) may support the soldering material 30 provided between the first and third solid portions 121a and 121c, and in this embodiment, the intermediate solid portion 121 (e.g., the second solid portion 121b) may extend between the first and third solid portions 121a and 121c and support the electrode tab 115 on which the soldering material 30 is provided.

Figure 9:
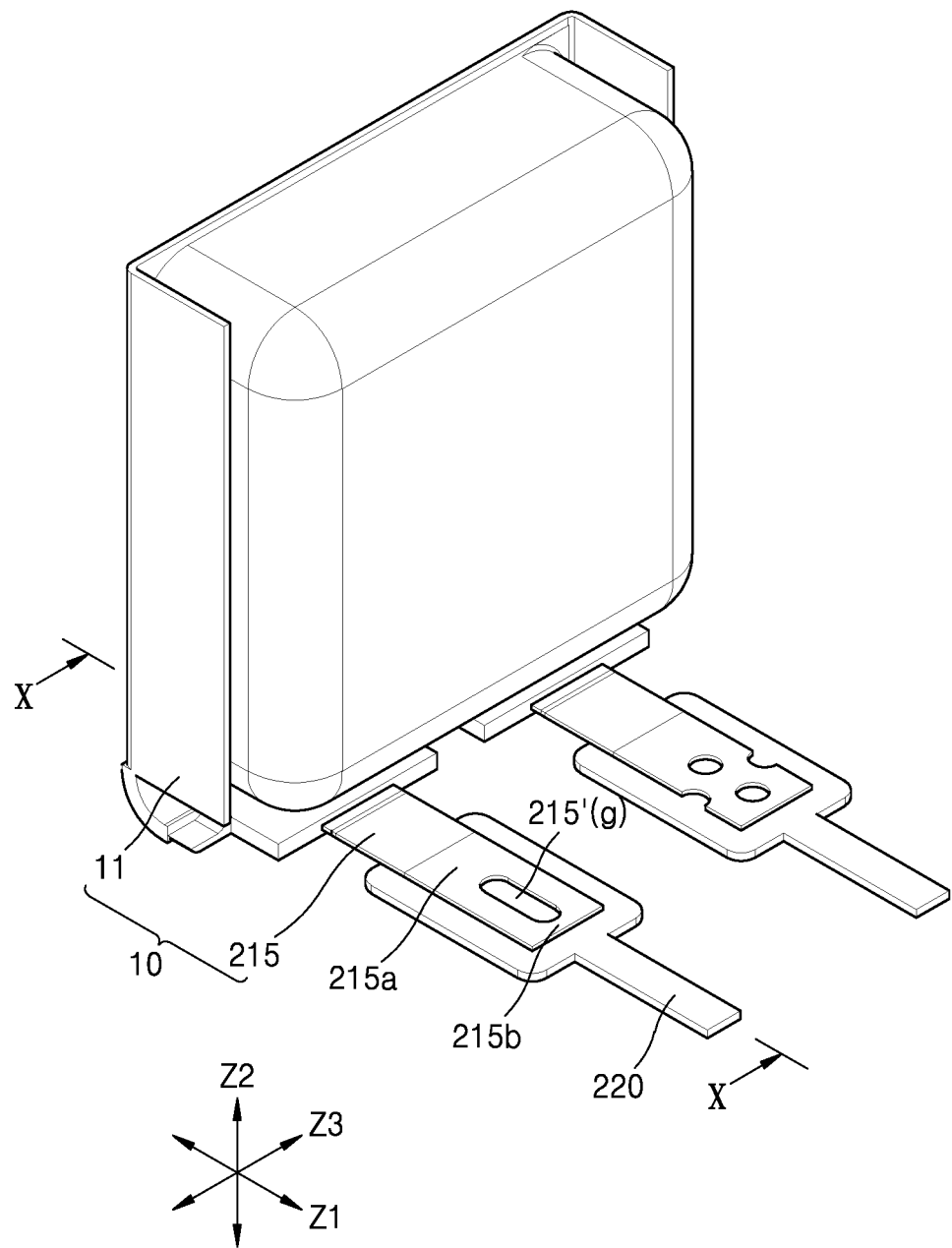
FIG. 9 is a perspective view illustrating a battery cell assembly according to another embodiment.
Figure 10:
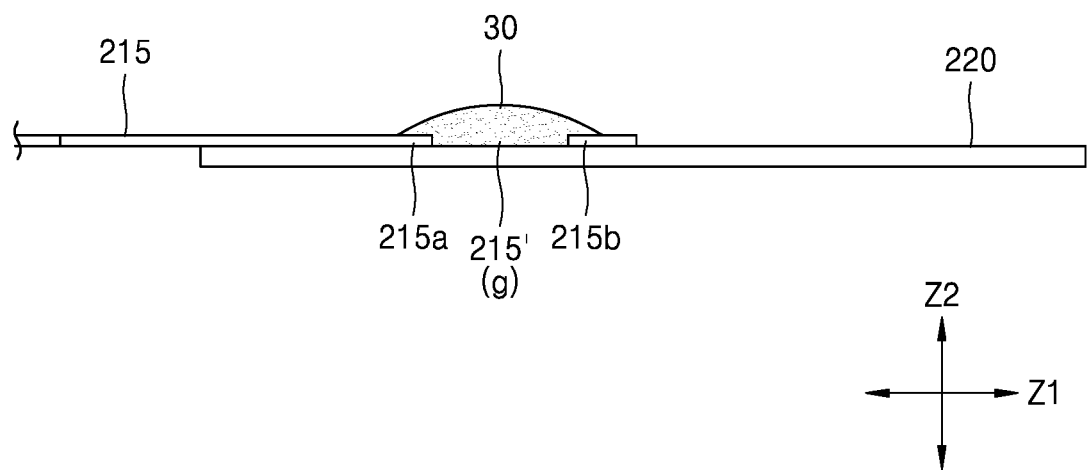
FIG. 10 is a cross-sectional view taken along the line X-X of FIG. 9.

FIG. 9 is a perspective view illustrating a battery cell assembly according to another embodiment. FIG. 10 is a cross-sectional view taken along the line X-X of FIG. 9.

Referring to FIGS. 9 to 10, a lead tab 220 may overlap an electrode tab 215, and for example, the lead tab 220 may be attached on a lower side of the electrode tab 215 in a second direction Z2. In this embodiment, an accommodation opening (e.g., an accommodation hole) 215' for accommodating a soldering material 30 may be formed in the electrode tab 215, which is arranged at a relatively upper position in the second direction Z2. In an embodiment, at least portions of the lead tab 220 and the electrode tab 215 overlap each other in a first direction Z1, and the accommodation opening 215' for accommodating the soldering material 30 may be formed in at least one of the lead tab 220 and the electrode tab 215, which overlap each other. For example, the lead tab 220 and the electrode tab 215 may overlap each other in the second direction Z2 crossing the first direction Z1, and in the embodiment shown in FIGS. 9 and 10, the electrode tab 215 and the lead tab 220 may overlap each other respectively at a relatively upper position and a relatively lower position. In addition, the accommodation opening 215' may be formed in the electrode tab 215, which is arranged at the relatively upper position in the second direction Z2, and the lead tab 220 arranged at the relatively lower position may close the lower side of the accommodation opening 215' to form the bottom of the accommodation hole 215' and provide a structure capable of containing the soldering material 30.

Although not shown in FIGS. 9 and 10, in another embodiment, the lead tab 220 and the electrode tab 215 may overlap with each other in the second direction Z2 in a state in which the lead tab 220 is arranged at a relatively upper position, and the electrode tab 215 is arranged at a relatively lower position. In addition, the accommodation opening 215' may be formed in the lead tab 220, which is arranged at the relatively upper position (e.g., over the electrode tab 215) in the second direction Z2, and the electrode tab 215 arranged at the relatively lower position may close the lower side of the accommodation opening 215' to form the bottom of the accommodation opening 215' and provide a structure capable of containing the soldering material 30.

For example, in an embodiment, the accommodation opening 215' may be formed in one of the lead tab 220 and the electrode tab 215 overlapping each other, for example, in one of the lead tab 220 and the electrode tab 215, which is arranged at a relatively high position. Here, the upper position and the lower position may respectively refer to a relatively high-level position and a relatively low-level position in the second direction Z2 crossing the first direction Z1 in which the electrode tab 215 extends. For example, in an embodiment, the relatively low level and the relatively high level may refer to different levels in the second direction Z2, that is, a direction in which a surface of the electrode tab 215 is viewed or the direction of (or normal to) the surface of the electrode tab 215. In an embodiment, the relatively low level and the relatively high level may refer to different levels in the direction of gravity, which corresponds to the second direction Z2. For example, the soldering material 30 for coupling together the electrode tab 215 and the lead tab 220 overlapping each other may be placed on a lower one of the electrode tab 215 and the lead tab 220 which is exposed through the accommodation opening 215' formed in a higher one of the electrode tab 215 and the lead tab 220, such that the electrode tab 215 and the lead tab 220 may be coupled to each other by the soldering material 30.

The following description will be provided primarily based on the structure in which the accommodation opening 215' for accommodating the soldering material 30 is formed in the electrode tab 215 and where the electrode tab 215 is arranged at a relatively upper position than the lead tab 220 overlapping the electrode tab 215. However, the following description may be applied in substantially the same manner to the structure in which the accommodation opening 215' is formed in the lead tab 220 and where the lead tab 220 is arranged at a relatively upper position than the electrode tab 215 overlapping the lead tab 220.

Referring to FIGS. 9 and 10, the electrode tab 215 may include solid portions 215a and 215b and an opening (g) between the solid portions 215a and 215b in the first direction Z1. The solid portions 215a and 215b may correspond to portions of the electrode tab 215 which are formed on both sides of the accommodation opening 215' in the first direction Z1 to define the accommodation opening 215'. The opening (g) may correspond to the accommodation opening 215' for accommodating the soldering material 30, and although the opening (g) and the accommodation opening 215' are denoted with different reference numerals in FIGS. 9 and 10, the opening (g) and the accommodation opening 215' may refer to substantially the same structure.

In an embodiment, the accommodation opening 215' may be formed in the electrode tab 215 having a closed shape (e.g., a closed periphery), and the electrode tab 215 may include the solid portions 215a and 215b and the opening (g) (corresponding to the accommodation opening 215'), which are alternately arranged in an arbitrary direction, such as the first direction Z1. The soldering material 30 for coupling the electrode tab 215 and the lead tab 220 to each other may be filled in at least the accommodation opening 215'. The solid portions 215a and 215b, between which the opening (g) (corresponding to the accommodation opening 215') is formed, may block the soldering material 30 at both sides of the opening (g). The soldering material 30 may be filled in the accommodation opening 215' from the bottom of the accommodation opening 215' formed (or sealed) by the lead tab 220 located at a relatively lower position and then on the solid portions 215a and 215b, which are on both sides of the accommodation opening 215' (corresponding to the opening (g)).

Figure 11:
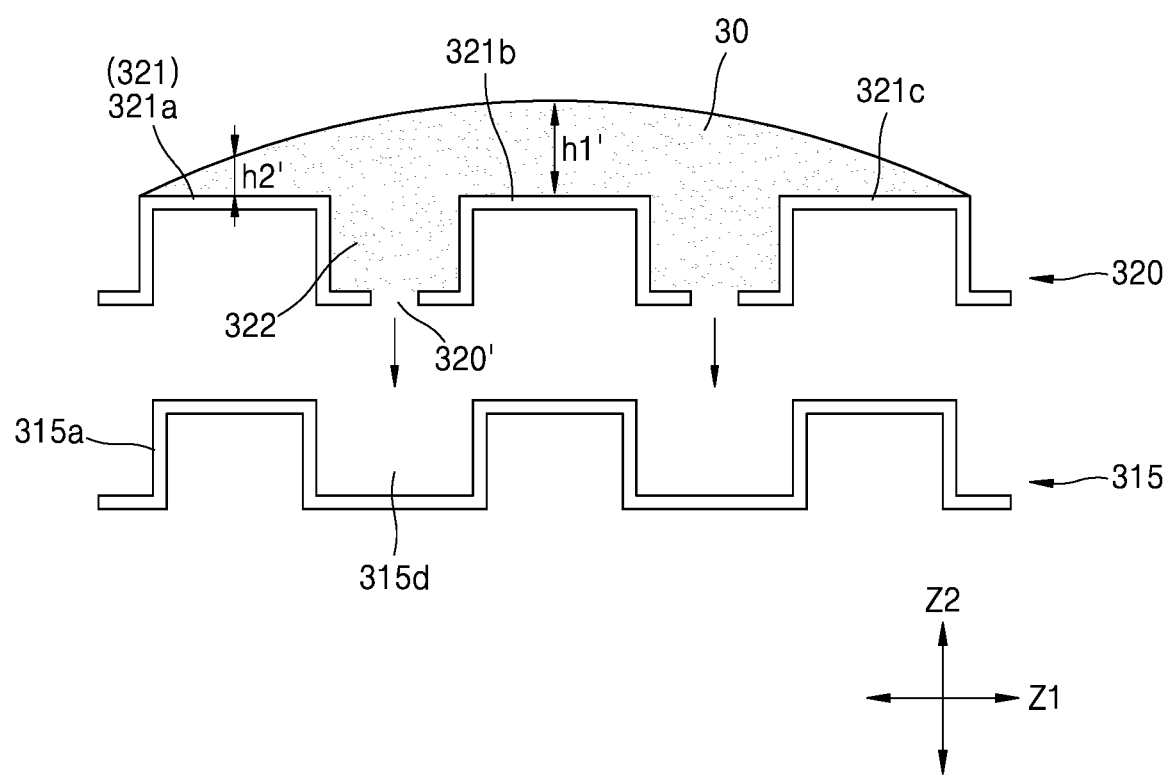
FIG. 11 is a cross-sectional view illustrating a coupling structure between an electrode tab and a lead tab of a battery cell assembly according to another embodiment.

FIG. 11 is a cross-sectional view illustrating a coupling structure between an electrode tab 315 and a lead tab 320 of a battery cell assembly according to another embodiment.

Referring to FIG. 11, the lead tab 320 and the electrode tab 315 may be arranged in a first direction Z1 and may at least partially overlap each other, and at least one of the lead tab 320 and the electrode tab 315 may include convex portions 321 and concave portions 322, which are alternately arranged in the first direction Z1. In an embodiment, the electrode tab 315 and the lead tab 320 may overlap with each other in a second direction Z2 crossing the first direction Z1. For example, in an embodiment, one of the electrode tab 315 and the lead tab 320 may be arranged at a relatively upper position in the second direction Z2 and may overlap the other, which is arranged at a relatively lower position in the second direction Z2. For example, in an embodiment, the second direction Z2 may refer to the direction of gravity. For example, a relatively upper one of the electrode tab 315 and the lead tab 320 may include the convex portions 321, which are adjacent to each other with the concave portions 322 therebetween to accommodate a soldering material 30 for coupling the electrode tab 315 and the lead tab 320 to each other. In this embodiment, the soldering material 30 may be provided between the convex portions 321, which are adjacent to each other.

In an embodiment, the electrode tab 315 and the lead tab 320 may include convex portions 321 and 315a and concave portions 322 and 315d, which are alternately arranged. For example, in an embodiment, the electrode tab 315 and the lead tab 320 may include the convex portions 321 and 315a and the concave portions 322 and 315d that correspond to (or match) each other. In another embodiment, the convex portions 321 and the concave portions 322 for providing a structure to accommodate the soldering material 30 may be formed on only an upper one of the electrode tab 315 and the lead tab 320, and in various other embodiments, the convex portions 321 and 315a and the concave portions 322 and 315d may be formed on only the electrode tab 315 or the lead tab 320.

The other one of the electrode tab 315 and the lead tab 320 that is arranged at a relatively lower position may receive the soldering material 30 from the upper one of the electrode tab 315 and the lead tab 320, and for example, the soldering material 30 may permeate from the upper one of the electrode tab 315 and the lead tab 320, which is arranged at a relatively upper position in the second direction Z2 corresponding to the direction of gravity, into the other one of the electrode tab 315 and the lead tab 320, which is arranged at a relatively lower position in the direction of gravity. As described above, the soldering material 30 may permeate from the relatively upper tab into the other tab located at a relatively lower position in the second direction Z2 corresponding to the direction of gravity, and to this end, openings (e.g., through-holes) 320' may be formed in sides of the concave portions 322 of the upper tab to allow the soldering material 30 to pass therethrough. The following description will be provided primarily based on the structure in which the openings 320' for accommodating the soldering material 30 are formed in the lead tab 320 and where the lead tab 320 is arranged at a relatively upper position than the electrode tab 315 overlapping the lead tab 320. However, the following description may be applied in substantially the same manner to the structure in which the openings 320' are formed in the electrode tab 315 and where the electrode tab 315 is arranged at a relatively upper position than the lead tab 320 overlapping the electrode tab 315.

In the embodiment shown in FIG. 11, the lead tab 320 may be arranged above the electrode tab 315. In this embodiment, the lead tab 320 arranged above the electrode tab 315 in the second direction Z2 may include the convex portions 321 and concave portions 322, which are alternately arranged above the electrode tab 315. For example, in an embodiment, the convex portions 321 and the concave portions 322 may be formed on the lead tab 320, which is arranged at an upper position than the electrode tab 315 in the second direction Z2. The convex portions 321 and the concave portions 322 may provide a structure for accommodating the soldering material 30 between the convex portions 321, and the soldering material 30 may be maintained on the lead tab 320 owing to the convex portions 321 and the concave portions 322 of the lead tab 320. As described above, the convex portions 321 and the concave portions 322 may be formed on the lead tab 320, which is arranged at an upper position than the electrode tab 315 overlapping the lead tab 320, and the openings 320' may be formed in the lead tab 320 arranged at an upper position to allow the soldering material 30 to flow downward to the electrode tab 315 through the lead tab 320. In this embodiment, the openings 320' may be formed in the concave portions 322 of the lead tab 320, which is arranged at a relatively upper position, and for example, the openings 320' may be formed in the bottoms of the concave portions 322 of the lead tab 320.

The lead tab 320 may include the convex portions 321 and the concave portions 322, which are alternately arranged in the first direction Z1. Here, the convex portions 321 may provide a structure which blocks the soldering material 30 to contain the soldering material 30 between two adjacent convex portions 321. Throughout this disclosure, the expression "the soldering material 30 is provided between adjacent convex portions 321" may indicate not only the configuration in which the soldering material 30 is provided between two most adjacent convex portions 321 from among the convex portions 321 arranged in the first direction Z1, but may also mean, for example, the configuration in which the soldering material 30 is provided between two adjacent convex portions 321 (e.g., first and third convex portions 321a and 321c), which are adjacent to each other in the first direction Z1 with an intermediate convex portion 321 (e.g., second convex portion 321b) therebetween. For example, in various embodiments, the soldering material 30, which is provided on the electrode tab 315 and the lead tab 320 overlapping each other, may be between two convex portions 321 which are most adjacent to each other in the first direction Z1, or may be between two convex portions 321 (e.g., the first and third convex portions 321a and 321c) that are adjacent to each other in the first direction Z1 with the intermediate convex portion 321 (e.g., the second convex portion 321b) therebetween.

In an embodiment, the expression "the soldering material 30 is provided between two adjacent convex portions 321" may also indicate that the soldering material 30 is provided on the two adjacent convex portions 321. For example, the soldering material 30 may be filled in the concave portions 322 between the convex portions 321, which are adjacent to each other, or may be filled the concave portions 322 and cover the intermediate convex portion 321 (e.g., the second convex portion 321b) to have a height (e.g., a predetermined height). In this embodiment, the soldering material 30 may also be provided on adjacent convex portions 321 (e.g., the first and third convex portions 321a and 321c). For example, the soldering material 30 may be formed in the form of a droplet covering the adjacent convex portions 321 (e.g., the first and third convex portions 321a and 321c). For example, the soldering material 30 may be filled in the concave portions 322 in the second direction Z2 or may cover the intermediate convex portion 321 (e.g., the second convex portion 321b) to form a maximum level h1' and a minimum level h2' between adjacent convex portions 321 (e.g., the first and third convex portions 321a and 321c).

In an embodiment, each of the concave portions 322 may refer to a concave space formed between adjacent convex portions 321 to contain the soldering material 30. However, in an embodiment, the soldering material 30 may be filled in the concave portions 322 and may be formed up to a height (e.g., a predetermined height) on the convex portions 321 provided on both sides of each of the concave portions 322. For example, in an embodiment, the expression "the soldering material 30 is provided between adjacent convex portions 321" may indicate that the soldering material 30 is filled in the concave portions 322 formed between the adjacent convex portions 321 and is also formed on the adjacent convex portions 321 outside the concave portions 322.

In an embodiment, the openings 320' may be formed in the concave portions 322 of the lead tab 320, which is arranged at a relatively upper position. For example, the openings 320' may be formed at the bottoms of the concave portions 322 in the second direction Z2. The soldering material 30 may be filled in the concave portions 322 and may flow downward from the lead tab 320 to the electrode tab 315 through the openings 320' of the concave portions 322 and permeate toward the electrode tab 315, which is arranged at a relatively lower position.

In an embodiment, the lead tab 320 and the electrode tab 315, which are arranged relatively at upper and lower positions, respectively, and overlap each other, may have corresponding (or matching) shapes and may include the convex portions 321 and 315a and the concave portions 322 and 315d, which are formed at corresponding positions. For example, the convex portions 321 and 315a of the lead tab 320 and the electrode tab 315 may be formed at positions facing each other, and the concave portions 322 and 315d of the lead tab 320 and the electrode tab 315 may be formed at positions facing each other. In this embodiment, the openings 320' formed in the concave portions 322 of the lead tab 320 may face the concave portions 315d of the electrode tab 315.

In an embodiment, the soldering material 30 may penetrate downward toward the electrode tab 315 through the openings 320' of the concave portions 322 formed on the lead tab 320 to fill in the concave portions 315d of the electrode tab 315, such that at least the concave portions 322 of the lead tab 320 arranged at a relatively upper position may be coupled to at least the concave portions 315d of the electrode tab 315 arranged at a relatively lower position by the soldering material 30. In an embodiment, the soldering material 30 permeating through the openings 320' of the lead tab 320 may flow through a gap between the electrode tab 315 and the lead tab 320 along the concave portions 322 and 315*d* and the convex portions 321 and 315*a* and may fill in the gap between the electrode tab 315 and the lead tab 320, such that the electrode tab 315 and the lead tab 320 may be coupled to each other by the soldering material 30.

As described above, according to the one or more of embodiments of the present disclosure, a battery cell assembly has an improved structure for coupling different materials to each other between the electrode tab of the battery cell and the lead tab configured to be connected to the electrode tab to form a charge-discharge path. For example, an embodiment provides a structure in which the electrode tab including an aluminum material is coupled to the lead tab by the soldering material. According to embodiments, the electrode tab including an aluminum material may be soldered to the lead tab using the soldering material without a bonding process, such as welding that requires adding a separate member to an aluminum material, and the electrode tab and the lead tab may be securely coupled to each other with relatively low process costs.

It should be understood that the embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the present disclosure as defined by the following claims and their equivalents.

What is claimed is:

1. A battery cell assembly comprising:
   a battery cell comprising a battery cell body and an electrode tab extending from the battery cell body in a first direction;
   a lead tab at least partially overlapping the electrode tab in the first direction and coupled to the electrode tab to provide an electrical connection therebetween; and
   a soldering material coupling the electrode tab and the lead tab to each other,
   wherein one of the electrode tab and the lead tab comprises solid portions and an opening between the solid portions in the first direction,
   wherein the other one of the electrode tab and the lead tab has a bent portion to extend through the opening such that one portion thereof is on an upper surface of one of the solid portions and another portion thereof is on a lower surface of another one of the solid portions, and
   wherein the soldering material is between adjacent ones of the solid portions.

2. The battery cell assembly of claim 1, wherein the soldering material is between adjacent ones of the solid portions from among the solid portions and on the adjacent ones of the solid portions.

3. The battery cell assembly of claim 2, wherein the soldering material is in the opening between the adjacent ones of the solid portions and is on the adjacent ones of the solid portions.

4. The battery cell assembly of claim 2, wherein:
   a contact angle measured from the soldering material on the adjacent ones of the solid portions to the adjacent ones of the solid portions is an acute angle of less than 90 degrees, or
   a contact angle measured from the soldering material on the adjacent ones of the solid portions to the electrode tab arranged on the adjacent ones of the solid portions is an acute angle of less than 90 degrees.

5. The battery cell assembly of claim 1, wherein:
   the soldering material is between adjacent ones of the solid portions from among the solid portions, and
   the adjacent ones of the solid portions are adjacent to each other with an intermediate solid portion therebetween.

6. The battery cell assembly of claim 5, wherein:
   the electrode tab has a concave portion to bypass the intermediate solid portion between the adjacent ones of the solid portions, and
   the soldering material is on the electrode tab.

7. The battery cell assembly of claim 6, wherein the intermediate solid portion is embedded in the soldering material.

8. The battery cell assembly of claim 6, wherein the electrode tab has a concave shape and is on the adjacent ones of the solid portions while bypassing the intermediate solid portion.

9. The battery cell assembly of claim 6, wherein the soldering material has a droplet shape with, in a second direction crossing the first direction, a maximum height below which the intermediate solid portion is embedded and a minimum height above the adjacent ones of the solid portions.

10. The battery cell assembly of claim 9, wherein the second direction is a normal direction of a surface of the electrode tab.

11. The battery cell assembly of claim 1, wherein the lead tab comprises:
    the solid portions arranged with the opening therebetween; and
    a connection bar connecting ends of the solid portions to each other.

12. The battery cell assembly of claim 11, wherein each of the solid portions has the end and an opposite end in a third direction that crosses the first direction and a second direction, the second direction being a normal direction of a surface of the electrode tab.

13. The battery cell assembly of claim 12, wherein:
    the ends of the solid portions are connected to each other by the connection bar, and
    the opposite ends of the solid portions are spaced apart from each other in an open form.

14. The battery cell assembly of claim 11, wherein the connection bar is at a second level in a second direction crossing the first direction, the second level being higher than a first level at where the solid portions are arranged in the second direction.

15. The battery cell assembly of claim 14, wherein the lead tab further comprises a plurality of bent portions that extend between the first level and the second level between the connection bar and the ends of the solid portions and have a round shape convex toward the soldering material, the plurality of bent portions respectively corresponding to the solid portions.

16. The battery cell assembly of claim 1, wherein:
    the lead tab comprises the solid portions arranged in the first direction with the opening therebetween, and
    the electrode tab has a zigzag shape extending across the opening between directly adjacent ones of the solid portions in the first direction, and the electrode tab covers opposite sides of the directly adjacent ones of the solid portions in a second direction crossing the first direction.

17. The battery cell assembly of claim 1, wherein:
- the lead tab comprises the solid portions that are alternately arranged in the first direction and are at different first and second levels in a second direction crossing the first direction, and
- the electrode tab has a flat plate shape extending across a region between adjacent ones of the solid portions arranged at the first level and one of the solid portions at the second level.

18. The battery cell assembly of claim 17, wherein the electrode tab has a flat plate shape at a constant level between the first and second levels in the second direction.

19. The battery cell assembly of claim 17, wherein the soldering material is on the electrode tab between adjacent ones of the solid portions at the first level, the first level being higher than the second level in the second direction.

20. The battery cell assembly of claim 19, wherein:
- an intermediate solid portion from among the solid portions is at the second level and is between the adjacent ones of the solid portions at the first level, and
- the intermediate solid portion supports the electrode tab at where the soldering material is arranged.

\* \* \* \* \*